D. N. SHOEMAKER.
GATE OPERATING DEVICE.
APPLICATION FILED NOV. 18, 1916.
1,240,096.
Patented Sept. 11, 1917.
4 SHEETS—SHEET 2.
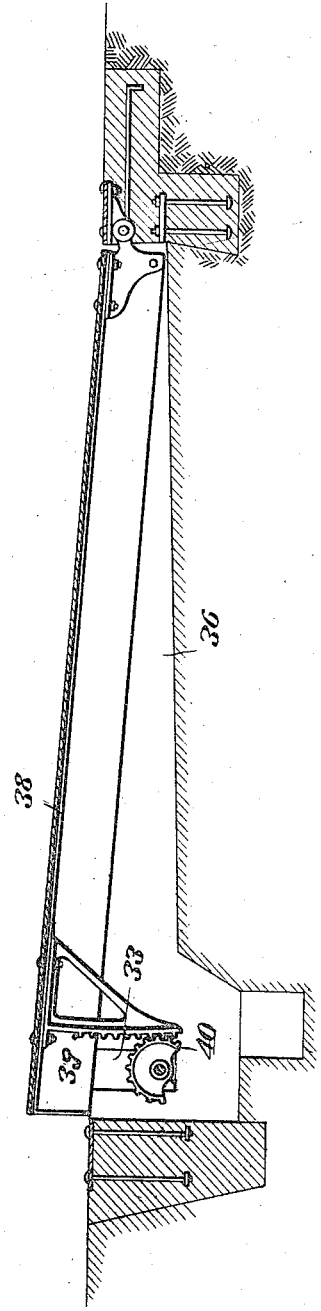
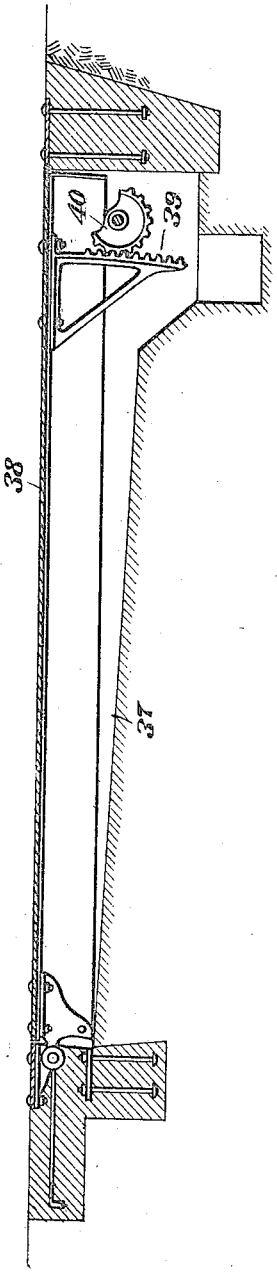
WITNESSES
INVENTOR
D. N. Shoemaker
BY Victor J. Evans
ATTORNEY D. N. SHOEMAKER.
GATE OPERATING DEVICE.
APPLICATION FILED NOV. 18, 1916.
1,240,096.
Patented Sept. 11, 1917.
4 SHEETS—SHEET 3.
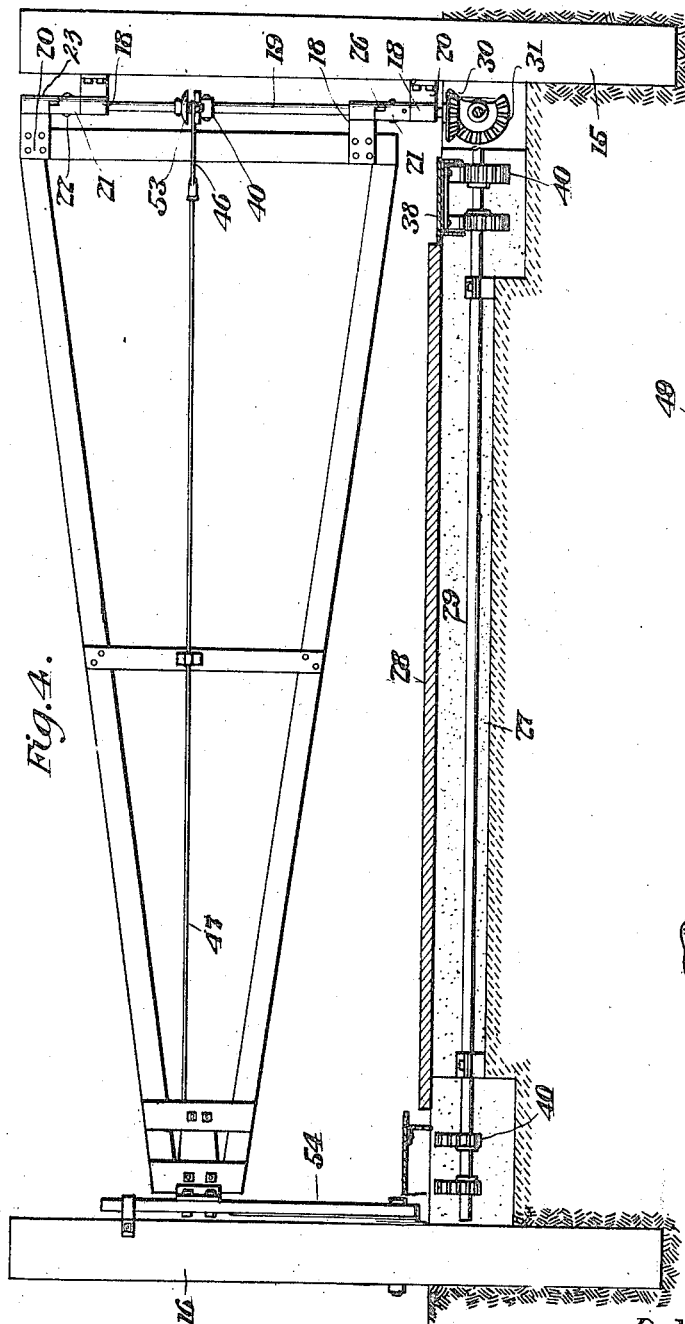
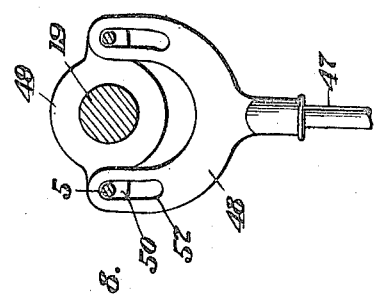
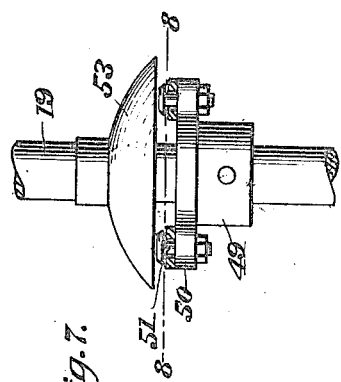
Witnesses
Inventor
D. N. Shoemaker
By Victor J. Evans
Attorney D. N. SHOEMAKER.
GATE OPERATING DEVICE.
APPLICATION FILED NOV. 18, 1916.
1,240,096.
Patented Sept. 11, 1917.
4 SHEETS—SHEET 4.
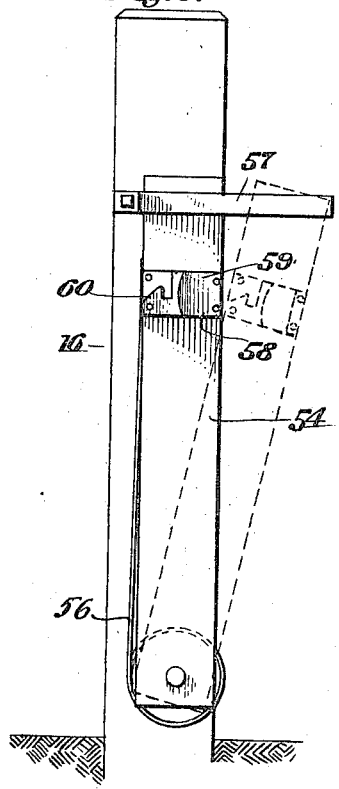
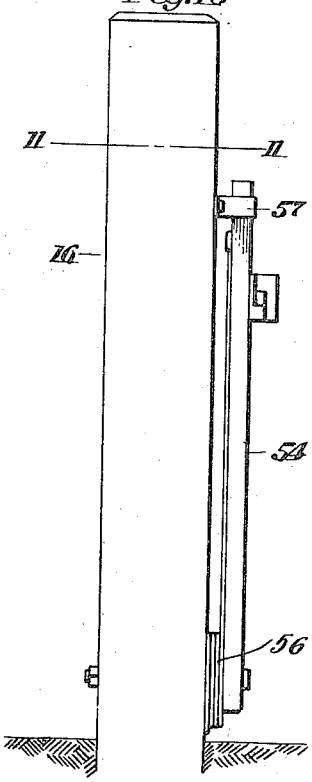
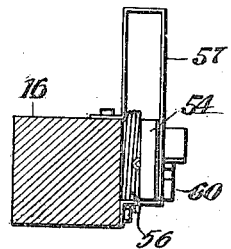
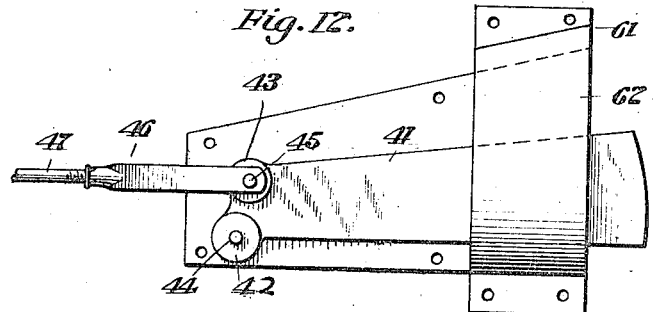
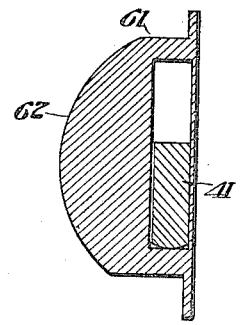
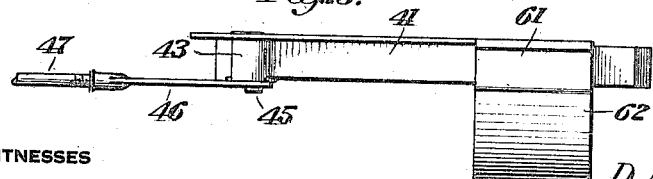
WITNESSES
INVENTOR
D. N. Shoemaker
BY Victor J. Evans
ATTORNEY

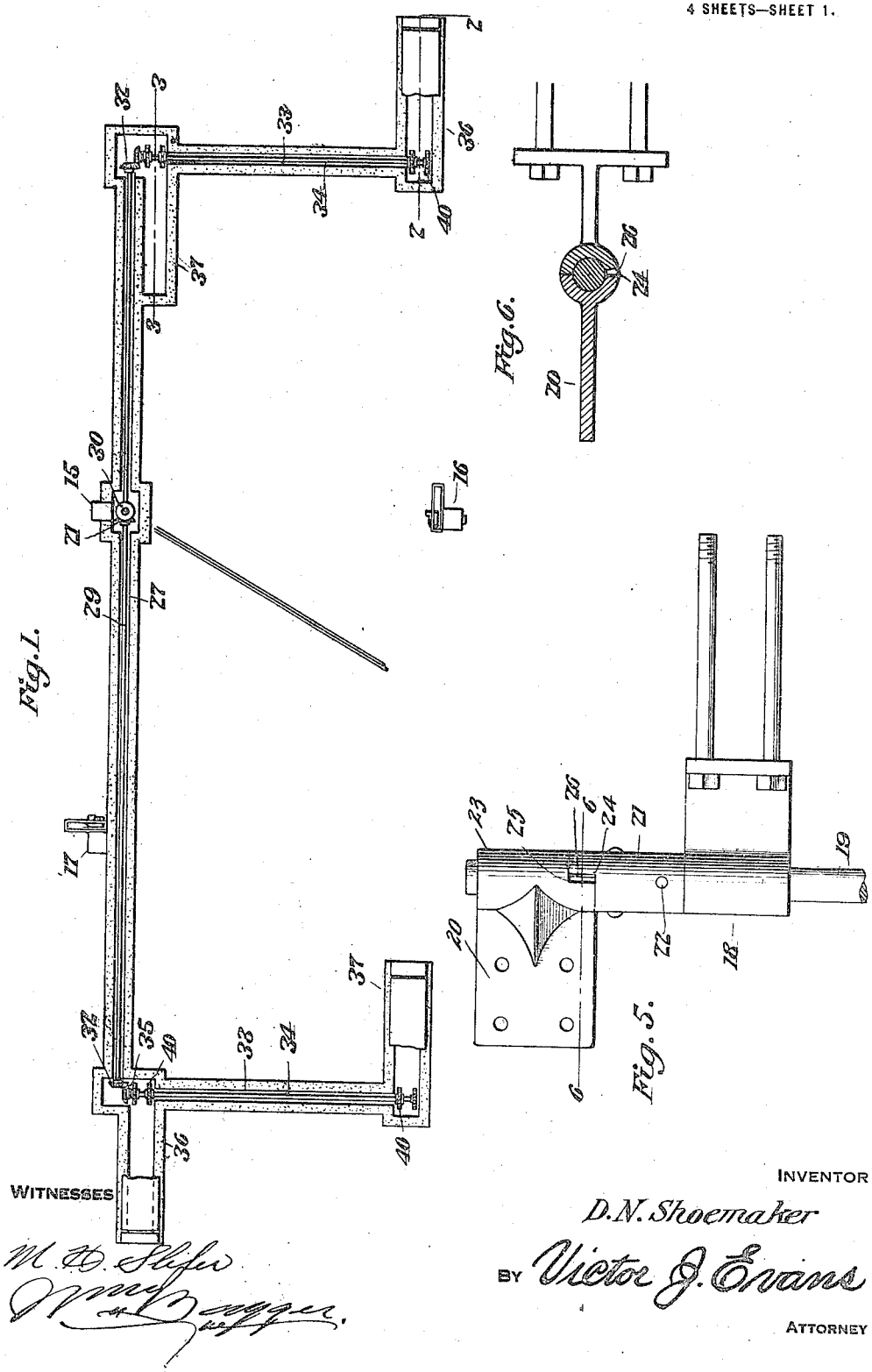

UNITED STATES PATENT OFFICE.

DANIEL N. SHOEMAKER, OF CAINESVILLE, MISSOURI.

GATE-OPERATING DEVICE.

1,240,096.　　　　　　　Specification of Letters Patent.　　　Patented Sept. 11, 1917.

Application filed November 18, 1916. Serial No. 132,131.

*To all whom it may concern:*

Be it known that I, DANIEL N. SHOE-MAKER, a citizen of the United States, residing at Cainesville, in the county of Harrison and State of Missouri, have invented new and useful Improvements in Gate-Operating Devices, of which the following is a specification.

This invention relates to gate operating devices of that class or type which are actuated automatically by an approaching vehicle, to open the gate in advance thereof, the gate being automatically restored to a closed position after the passage of the vehicle.

The invention has for its object to produce a device which is in the nature of a swinging crane which may be utilized for supporting a gate structure of any desired construction and dimensions, said crane being swingingly supported on a hinge post, and means being provided whereby said crane may be swung from a closed to an open position, and vice versa, by the action of a vehicle of any kind; a latch post and a stop post being provided with which the free end of the crane is connected in its open and closed positions, respectively.

A further object of the invention is to simplify and improve the hinge means whereby the crane is supported.

A further object of the invention is to simplify and improve the latch means whereby the crane is secured in its open and closed positions.

A further object of the invention is to produce simple and improved means for actuating the latch means.

A further object of the invention is to produce a simple and effective shock absorbing device to support the latch mechanism whereby the crane is secured in its open and closed positions.

A further object of the invention is to simplify and improve the construction, operation and general assemblage of the parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a diagrammatic plan view of the improved swinging crane or gate support and the means for actuating the same.

Fig. 2 is a sectional detail view taken on the line 2—2 in Fig. 1.

Fig. 3 is a sectional detail view taken on the line 3—3 in Fig. 1.

Fig. 4 is a view in elevation on a larger scale of the crane and the supporting means for the same.

Fig. 5 is a detail view in elevation of one of the hinges.

Fig. 6 is a sectional detail view taken on the line 6—6 in Fig. 5.

Fig. 7 is a detail view in elevation of the trip mechanism.

Fig. 8 is a sectional detail view taken on the line 8—8 in Fig. 7.

Fig. 9 is a front view of the latch post and related parts.

Fig. 10 is a side view of the same.

Fig. 11 is a sectional view taken on the line 11—11 in Fig. 10.

Fig. 12 is a detail view in elevation of the latch.

Fig. 13 is a top plan view of the same.

Fig. 14 is a sectional detail view taken on the line 14—14 in Fig. 12.

Corresponding parts in the several figures are denoted by like characters of reference.

The improved device embodies in its construction a hinge post 15, a latch post 16, and a stop post 17, it being understood that the designation "post" is intended to include any structure capable of carrying and supporting the mechanism connected therewith. In the drawings the posts 15 and 16 are located adjacent to opposite sides of a road or highway across which the gate carrying crane extends; the post 17 is located at the same side of the road as the hinge post 15 and at a suitable distance from the latter.

Secured on the hinge post 15 are hinge members 18 affording bearings for a vertical rod or shaft 19. C is a suitably constructed crane with which hinge members 20 are connected, said hinge members being rotatably mounted on the rod or shaft 19 above and in spaced relation to the hinge members 18.

Secured on the shaft 19 directly above each of the hinge members 18 is a sleeve 21. The sleeves 21 may be secured on the shaft 19 by transverse pins or fastening members 22, and said sleeves serve to support the hinge members 20 carrying the weight of the crane. The meeting ends of the sleeves 21 and of the knuckles or tubular portions 23 of the hinge members 20 are mutilated by providing the same with notches 24, 25, said notches being of such dimensions that interspaces 26 will be formed between the proposed side walls thereof. It follows that the rod or shaft 19 carrying the sleeve 21 may have a limited rocking movement independently of the knuckles 23. If such rocking movement be continued in either direction, after the side walls of the notches 24, 25 are in contact with each other, the hinge members 20 carrying the crane C will be caused to swing in the direction of rotation of the shaft 19.

At one side of the road or highway in line with the posts 15, 17 is formed a shallow trench 27 which may be constructed of or lined with cement or other waterproof material and for which a suitable cover 28 may be provided. Supported for rotation in said trench beneath the hinge rod or shaft 19 is a longitudinal main shaft 29, said hinge shaft and main shaft being provided with intermeshing bevel gears 30, 31. The main shaft 29 is provided at the ends thereof with bevel gears 32, 32. Transversely disposed trenches 33, 33 communicate with the longitudinal trench 27 at the ends thereof, said transverse trenches extending beneath and across the road or highway, which latter is designated by H. Supported for rotation in the transverse trenches 33, 33 are rock shafts 34, 34, each of said rock shafts carrying a bevel gear 35 meshing with one of the bevel gears 32. Communicating with each of the trenches 33 are two casings or housings 36, 37 that extend in opposite directions with respect to the trench with which they communicate, said housings being also arranged adjacent to opposite ends of such trench. The housings 36, 37 are preferably lined with concrete, and fulcrumed in said housings at the ends thereof which are distant from the respective trenches 33 are levers 38 each of which carries a segment rack 39 meshing with gear wheels 40 on the respective shafts 34. The gears 40 may be sectors, as shown in the drawings, although obviously complete gear wheels may be used. The parts are so arranged and proportioned that when the levers or wheel boards 39 in the housings 36 are in a raised position, the levers or wheel boards in the housings 37 will be lowered within said housings. If the levers in the housings 36 are depressed by the wheels at one side of an approaching vehicle the rock shafts 34 will be partly rotated, thereby elevating the levers in the housings 37. The housings 36 extend from the respective trenches 33 in the direction of vehicles approaching the gateway from either side, while the housings 37 extend from the respective trenches 33 in the direction of the gateway so that the levers or wheel boards in the said housings 37 will be actuated by the wheels at one side of vehicles that have passed through the gateway. The parts are, moreover, so arranged that when either rock shaft is rotated by the action of one of the wheel boards in the housings 36, said rock shaft will actuate the main shaft and through said main shaft the hinge shaft to swing the crane from the latch post in the direction of the stop post, thereby permitting the passage of a vehicle. When, on the other hand, the lever or wheel board in either housing 37 is depressed by the wheels of a vehicle that has passed through the gateway, the rotation of the several shafts will be in the opposite direction, and the crane will swing from the stop post in the direction of the latch post. It may be here stated that the crane is intended to carry a gate of any suitable approved construction and of any desired material or combination of materials, such as wood or the like, the crane being merely in the nature of a gate supporting and actuating element.

With respect to the construction of the housings 36, 37 and the levers or wheel boards operating therein, it may be stated that reinforced concrete or other lining material may be employed for the housings and that structural steel is preferably used in the construction of the levers or footboards in order that great strength and durability may be insured. The means for supporting the levers and the detailed construction thereof is capable of such infinite variation that no detailed or specific description is required. It is also obvious that the structure is to be so proportioned that ample room will be left for the crane to swing in the direction of the gate post when the device is actuated by a vehicle approaching the gateway in either direction.

The crane C carries at the free end thereof a gravity latch 41, the same being provided at the heel end thereof with eyes 42, 43, one of which, 42, is for the passage of the pin or pivot member 44 on which the latch is pivotally supported. The eye 43 is connected by a pin 45 with a connector 46 threaded on one end of a rod 47, the other end of which carries a yoke 48, the rod 47 being threadedly engaged with the connector 46 and with the yoke 48 in order that proper adjustment may be made. The yoke 48 straddles the hinge shaft 19 which latter carries a sleeve 49 provided with diametrically opposite arms 50, said arms carrying pins or pivot members 51 that engage slots 52 in the limbs of the yoke 48. When the hinge shaft is rotated about its axis in either direction, one of the bolts 51 will engage the end wall of one of the slots 52, thereby pulling the rod 47 so as to lift the free end of the latch member 41, the other bolt 51 being free to travel in the slot 52 engaged thereby, this movement continuing only until the latch member has been lifted. At this time the walls of the notches 24 in the hinge knuckles 21 will engage the walls of the notches 25 in the hinge members 20, thereby causing the crane to swing in the desired direction. The hinge shaft 19 carries a hood 53 which is mounted above the trip mechanism formed by the yoke 48 and related parts in order that said mechanism may be protected from snow, ice and other obstructions.

The latch post and the stop post are each equipped with a shock absorbing device comprising an arm or lever 54 fulcrumed at 55 and actuated by a spring 56, the free end of the lever 54 being guided in a keeper 57 whereby its movement is limited. The lever 54 carries a catch member 58 equipped with a bumper 59 made preferably of rubber or other resilient material, each catch member having also a beveled hook 60 facing and adapted to be engaged by the latch member 41 when the crane swings in the direction thereof. The latch member 41 operates in a keeper 61 having a swelled cheek 62 which is suitably arranged and proportioned to engage the bumper 59. It will be seen that when the crane swings in either direction, the movement thereof will first be arrested by the cheek 62 engaging the bumper 58, thereby permitting the gravity latch to drop into engagement with the catch member during the period when the spring of the shock absorber is being tensioned, thereby latching the gate in engagement with the latch post or the stop post, as the case may be.

From the foregoing description, taken in connection with the drawings hereto annexed, the operation and advantages of this invention will be readily understood. It will be seen that by the mechanism provided the gate carrying crane will be swung to an open position in advance of a vehicle approaching from either direction, and will be automatically closed behind such vehicle after the latter passes through the gateway. While the term "gate" has been herein used, it is, of course, to be understood that said term is intended to include doors and barriers of all kinds that are capable of being used in connection with this device. It is also evident that the general construction and arrangement of the constituent parts of the device may be changed and modified to suit the varying conditions under which the device is to be used, and that changes and alterations of such nature are to be regarded as being entirely within the scope of the invention. It is also obvious that the device may be actuated not by wheeled vehicles alone, but also by sleds, sleighs and the like, the only requisite being that provision be made for properly actuating the levers or foot boards at either side of the gateway. It may also be stated that the provision of movable covers for the various trenches and housings is intended in order that the working parts of the device may be readily examined, lubricated and otherwise attended to when necessary.

Having thus described the invention, what is claimed as new, is:—

1. In a device of the class described, a hinge shaft, a crane carried and actuated thereby, a main shaft disposed longitudinally at right angles to the hinge shaft, intermeshing gears on the hinge shaft and the main shaft, transversely disposed operating shafts having gear wheels fixed thereon adjacent to the ends thereof, intermeshing gears on the operating shafts and the main shaft, and operating levers at diametrically opposite sides of the operating shafts, said levers having rack segments meshing with the gear wheels on the operating shafts.

2. In a device of the class described, a hinge shaft, a crane carried and actuated thereby, a main shaft disposed longitudinally at right angles to the hinge shaft, intermeshing gears on the hinge shaft and the main shaft, transversely disposed operating shafts having gear wheels fixed thereon adjacent to the ends thereof, intermeshing gears on the operating shafts and the main shaft, and operating levers at diametrically opposite sides of the operating shafts, said levers having rack segments meshing with the gear wheels on the operating shafts; and covered trenches and housings in which the main shaft and the operating shafts are supported for rotation and the operating levers are housed.

3. In a device of the class described, a swingingly supported crane, a latch post and a stop post limiting the movement thereof, a latch member carried by the crane, and shock absorbing means on the respective posts, said shock absorbing means including a lever, a keeper limiting the movement thereof, a spring actuating the lever in one direction, and a bumper carried by the lever.

4. In a device of the class described, a swingingly supported crane having a latch member, and a latch post and a stop post limiting the movement of the swinging crane, each of said posts being equipped with a swingingly supported lever, a keeper limiting the movement thereof, an actuating spring for the lever, a catch member carried by the lever, and a bumper mounted on the catch member.

5. In a device of the class described, a swingingly supported crane having a latch member, and a latch post and a stop post limiting the movement of the swinging crane, each of said posts being equipped with a swingingly supported lever, a keeper limiting the movement thereof, an actuating spring for the lever, a catch member carried by the lever, and a bumper mounted on the catch member, in combination with a keeper limiting the movement of the latch carried by the crane, said keeper having a swelled cheek portion adapted for engagement with the bumper.

In testimony whereof I affix my signature.

DANIEL N. SHOEMAKER.

Copies of this patent may be obtained for five cents each, by addressing the "Commissioner of Patents, Washington, D. C."